United States Patent
Lozano et al.

(10) Patent No.: US 7,113,558 B2
(45) Date of Patent: Sep. 26, 2006

(54) SPACE-TIME PROCESSING FOR WIRELESS SYSTEMS WITH MULTIPLE TRANSMIT AND RECEIVE ANTENNAS

(75) Inventors: Angel Lozano, New York, NY (US); Farrokh Rashid-Farrokhi, Fremont, CA (US); Reinaldo A Valenzuela, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/842,857

(22) Filed: May 11, 2004

(65) Prior Publication Data

US 2004/0208258 A1    Oct. 21, 2004

Related U.S. Application Data

(62) Division of application No. 09/641,414, filed on Aug. 18, 2000, now Pat. No. 6,778,612.

(51) Int. Cl.
   *H04L 1/02* (2006.01)
(52) U.S. Cl. .................... 375/347; 375/348
(58) Field of Classification Search ............. 375/259, 375/260, 267, 299, 346–349, 358; 455/101, 455/132, 134–135, 278.1, 296; 370/206, 370/208, 491
See application file for complete search history.

(56) References Cited

U.S. PATENT DOCUMENTS

| | | | | |
|---|---|---|---|---|
| 5,940,439 A | * | 8/1999 | Kleider et al. ............... | 375/225 |
| 5,991,273 A | * | 11/1999 | Abu-Dayya ................. | 370/252 |
| 6,351,499 B1 | * | 2/2002 | Paulraj et al. ............... | 375/267 |
| 6,373,832 B1 | * | 4/2002 | Huang et al. ............... | 370/342 |
| 6,377,632 B1 | * | 4/2002 | Paulraj et al. ............... | 375/299 |

(Continued)

FOREIGN PATENT DOCUMENTS

EP    0 999 658 A2    5/2000

(Continued)

OTHER PUBLICATIONS

George Jongren et al., "Combining Transmit Antenna Weights And Orthogonal Space-Time Block Codes By Utilizing Side Information", *IEEE Asilomar Conference*, Oct. 24-27, 1999, pp. 1562-1566.

(Continued)

*Primary Examiner*—Khanh Tran
(74) *Attorney, Agent, or Firm*—Eugene J. Rosenthal

(57) ABSTRACT

Signals are developed for use in a wireless system with multiple transmit and multiple receive antennas so that even in the face of some correlation the most open-loop capacity that can be achieved using a substantially open-loop system with a channel of that level of correlation is obtained. In accordance with the principles of the invention, the signals transmitted from the various antennas are processed so as to improve their ability to convey the maximum amount of information. More specifically, the data to be transmitted is divided into M+1 substreams, where M is the number of transmit antennas. Each transmit antenna is supplied with a combination signal that is made up of a weighted version of a common one of the substreams and a weighted version of a respective one of the substreams that is supplied uniquely for that antenna, so that there are M transmit signals. A receiver having N antennas receives the M transmit signals as combined by the channel and reconstitutes the original data therefrom. This may be achieved using successive decoding techniques. Advantageously, the capacity, i.e., the rate of information that can be conveyed with an arbitrarily small probability of error when the instantaneous forward channel condition is unknown to the transmitter, is maximized.

1 Claim, 3 Drawing Sheets

U.S. PATENT DOCUMENTS 6,594,473 B1 * 7/2003 Dabak et al. ............... 455/101
6,728,307 B1 * 4/2004 Derryberry et al. ......... 375/219

FOREIGN PATENT DOCUMENTS

| EP | 1 054 519 A1 | 11/2000 |
|---|---|---|
| EP | 1 117 197 A2 | 7/2001 |
| WO | WO 98/18272 | 4/1998 |

OTHER PUBLICATIONS

George Jongren et al., "Utilizing Quantized Feedback Information in Orthogonal Space-Time Block Coding", *IEEE Globecome '00*, Nov. 27-Dec. 1, 2000, pp. 995-999.

* cited by examiner

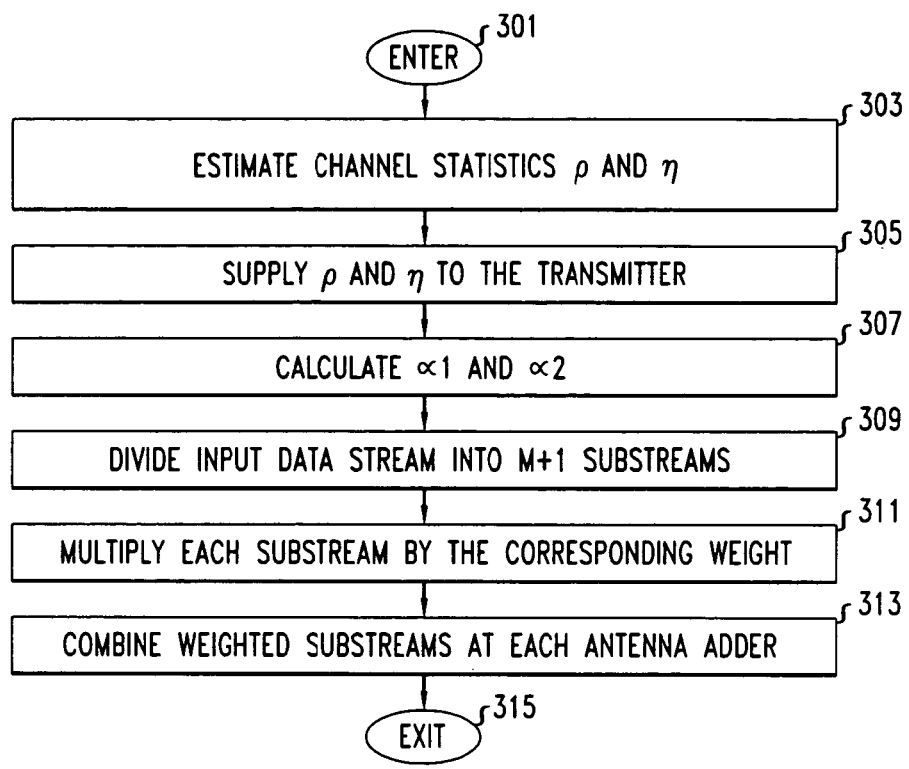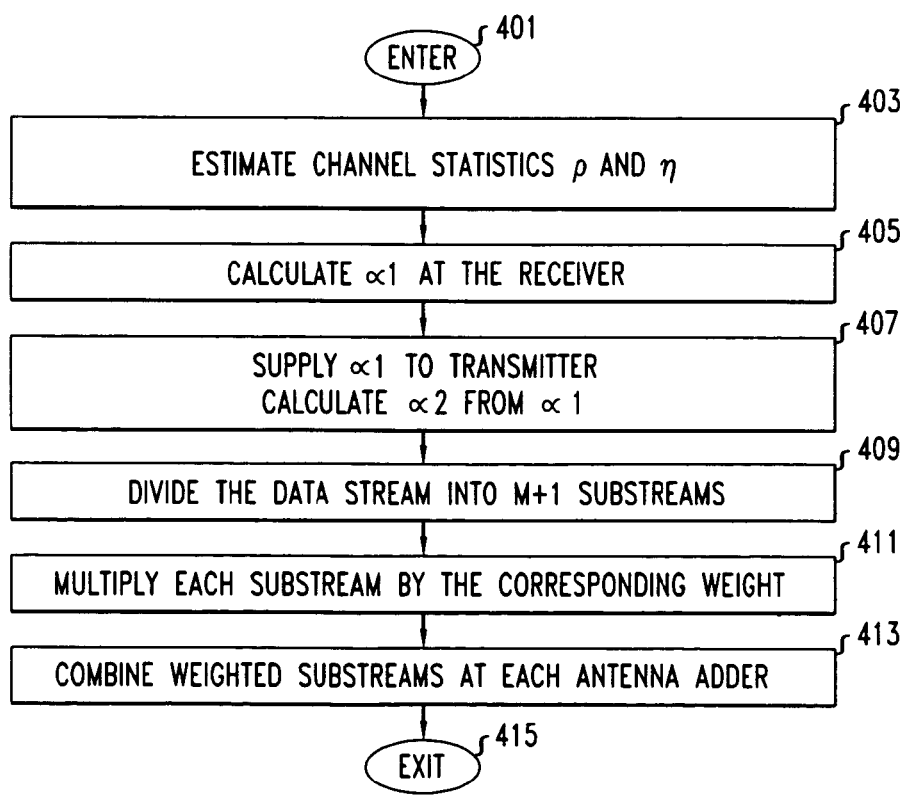

SPACE-TIME PROCESSING FOR WIRELESS SYSTEMS WITH MULTIPLE TRANSMIT AND RECEIVE ANTENNAS

This application is a division of application Ser. No. 09/641,414, filed Aug. 18, 2000, now U.S. Pat. No. 6,778,612.

TECHNICAL FIELD

This invention relates to the art of wireless communications, and more particularly, to wireless communication systems using multiple antennas at the transmitter and multiple antennas at the receiver, so called multiple-input multiple-output (MIMO) systems.

BACKGROUND OF THE INVENTION

It is well known in the art that multiple-input multiple-output (MIMO) systems can achieve dramatically improved capacity as compared to single antenna, i.e., single antenna to single antenna or multiple antenna to single antenna, systems. However, to achieve this improvement, it is preferable that there be a rich scattering environment, so that the various signals reaching the multiple receive antennas be largely uncorrelated. If the signals have some degree of correlation, and such correlation is ignored, performance degrades and capacity is reduced.

SUMMARY OF THE INVENTION

We have invented a way of developing signals in a MIMO system such that even in the face of some correlation the most open-loop capacity that can be achieved using a channel of that level of correlation is obtained. In accordance with the principles of the invention, the signals transmitted from the various antennas are processed so as to improve their ability to convey the maximum amount of information. More specifically, the data to be transmitted is divided into M+1 substreams, where M is the number of transmit antennas. Each transmit antenna is supplied with a combination signal that is made up of a weighted version of a common one of the substreams and a weighted version of a respective one of the substreams that is supplied uniquely for that antenna, so that there are M transmit signals. A receiver having N antennas receives the M transmit signals as combined by the channel and reconstitutes the original data therefrom. This may be achieved using successive decoding techniques. Advantageously, the open-loop capacity, i.e., the rate of information that can be conveyed with an arbitrarily small probability of error when the instantaneous forward channel condition is unknown to the transmitter, is maximized.

In one embodiment of the invention, the weights are determined by the forward channel transmitter using channel statistics of the forward link which are made known to the transmitter of the forward link by being transmitted from time to time from the receiver of the forward link by the transmitter of the reverse link. In another embodiment of the invention, a determination of weight parameter, or the weights themselves, is made by the forward channel receiver using the channel statistics of the forward link and the determined weight parameter, or weights, is made known to the transmitter of the forward link by being transmitted from time to time from the receiver of the forward link by the transmitter of the reverse link.

BRIEF DESCRIPTION OF THE DRAWING

In the drawing:

FIG. 3 shows an exemplary process, in flow chart form, for developing signals to transmit in a MIMO system such that even in the face of some correlation the most open-loop capacity that can be achieved with a channel of that level of correlation is obtained with a substantially open-loop process, in accordance with the principles of the invention;

FIG. 4 shows another exemplary process, in flow chart form, for developing signals to transmit in a MIMO system such that even in the face of some correlation the most open-loop capacity that can be achieved with a channel of that level of correlation is obtained with a substantially open-loop process, in accordance with the principles of the invention.

DETAILED DESCRIPTION

Figure 1:
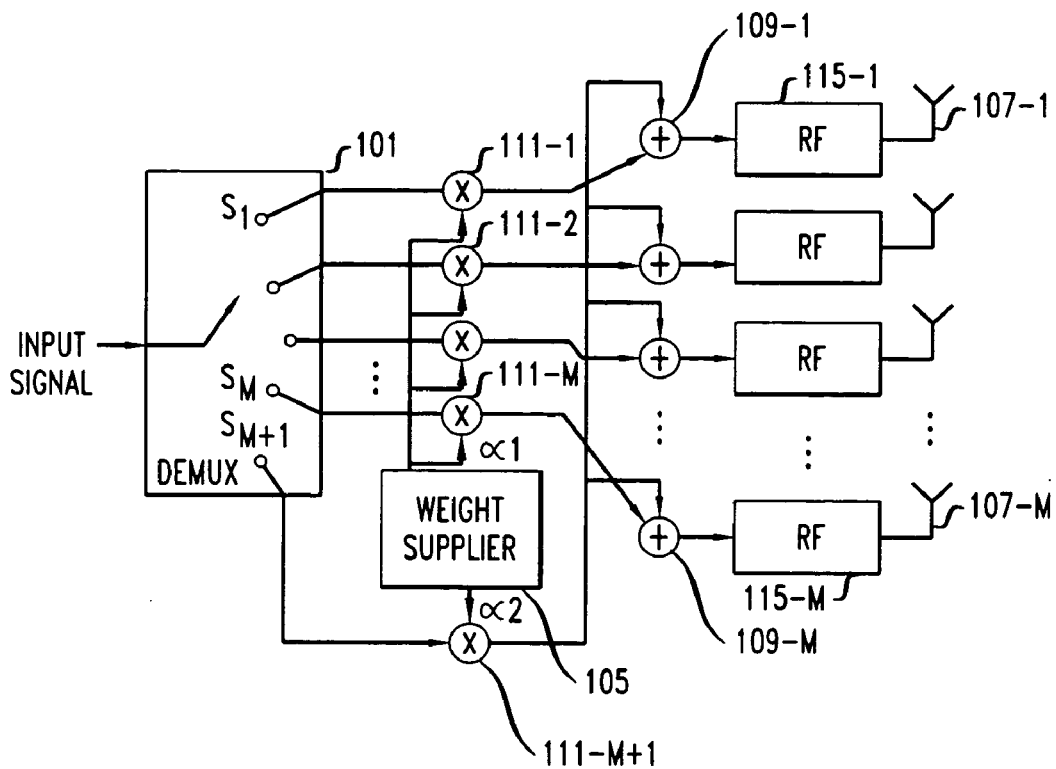
FIG. 1 shows an exemplary portion of a transmitter for developing signals to transmit in a MIMO system having a transmitter with M transmit antennas transmitting over a forward channel, such that even in the face of some correlation the most open-loop capacity that can be achieved with a channel of that level of correlation is obtained, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary portion of a transmitter for developing signals to transmit in a MIMO system having a transmitter with M transmit antennas transmitting over a forward channel, such that even in the face of some correlation the most open-loop capacity that can be achieved with a channel of that level of correlation is obtained, in accordance with the principles of the invention. Shown in FIG. 1 are a) demultiplexer (demux) 101; b) weight supplier 105; c) antennas 107, including antennas 107-1 through 107-M; d) adders 109, including adders 109-1 through 109-M; e) multipliers 111-1 through 111 -M+1; and f) radio frequency (RF) converters 115; including 115-1 through 115-M.

Demultiplexer 101 takes a data stream as an input and supplies as an output M+1 data substreams by supplying various bits from the input data stream to each of the data substreams. The data substreams are supplied by demultiplexer 101 to a respective one of multipliers 111. Multiplier 111-1 through 111-M multiply each value of the first M data substreams by a first weight supplied by weight supplier 105. Typically, each of the first M weighted data substreams are of equal rate. Similarly, multiplier 111-M+1 multiplies each value of the M+1$^{th}$ data substream by a second weight supplied by weight supplier 105.

Typically the M+1$^{th}$ data substream is not at the same rate as the first M data substreams. As will be recognized by those of ordinary skill in the art, the particular rates for the first M data substreams and the M+1$^{th}$ data substream are dependent on the receiver, in particular, the order in which the receiver performs the successive decomposition. Thus, the particular rates are typically negotiated from time to time between the receiver and the transmitter. Note that the more correlated the channel is, the larger the rate of the M+1$^{th}$ data substream.

The first and second weights may be related to each other, and may be developed by weight supplier 105 from a common weight parameter which may be derived from statistics of the forward channel, as will be described in more detail hereinbelow. In one embodiment of the invention, weight supplier 105 actually develops the weight values in response to information received via the reverse channel from the receiver shown and described further in FIG. 2. In another embodiment of the invention the weight values are developed in the receiver, then supplied via the reverse channel to the transmitter, in which they are stored in weight supplier 105 until such time as they are required. A process for developing the weights in accordance with an aspect of the invention will be described hereinbelow.

Each of the first M weighted data substreams is supplied as an input of a respective one of adders 109. Each of adders 109 also receives at its other input the weighted M+1$^{th}$ data substream which is supplied as an output by multiplier 111-M+1. Each of adders 109 combines the two weighted data substreams input to it so as to produce a combined branch signal. Thus, M combined branch signal are produced, one by each of adders 109. Each of radio frequency (RF) converters 115 receives one of the M combined branch signals and develops therefrom radio frequency versions of the M combined branch signals, which are then supplied to respective ones of antennas 107 for transmission.

Figure 2:
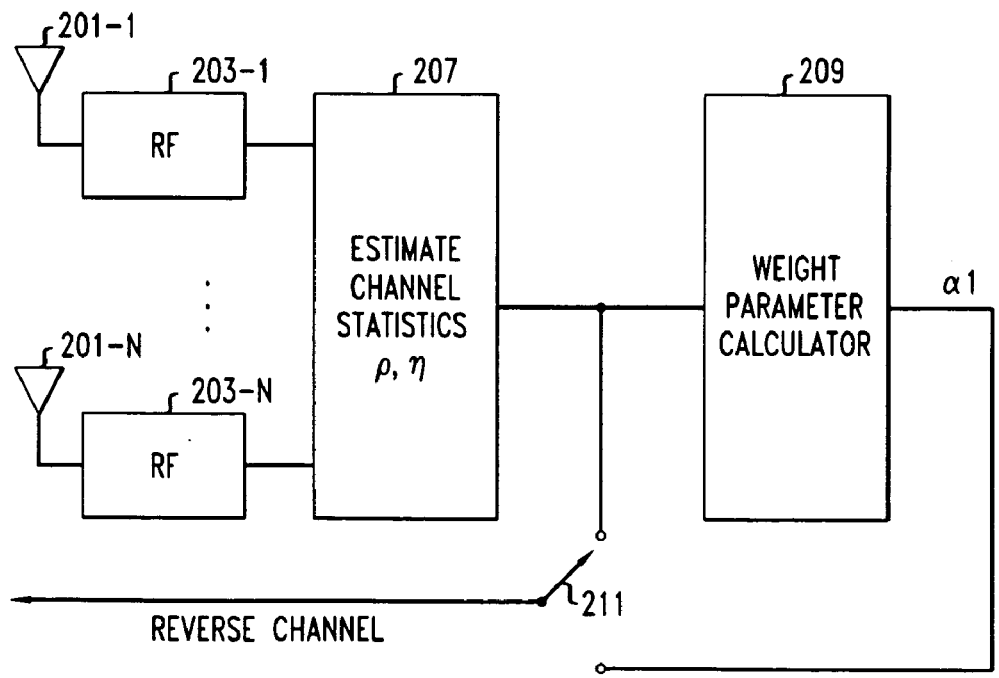
FIG. 2 shows an exemplary portion of a receiver for a MIMO system arranged in accordance with the principles of the invention.

FIG. 2 shows an exemplary portion of a receiver for a MIMO system arranged in accordance with the principles of the invention. FIG. 2 shows a) N antennas 201, including antennas 201-1 through 201-N; b) radio frequency (RF) converters 203, including radio frequency (RF) converters 203-1 through 203-N; c) channel statistics estimation unit 207; e) optional weight parameter calculator 209; and f) optional switch 211. Each of antennas 201 receives radio signals and supplies an electrical version thereof to its respective, associated one of radio frequency (RF) converters 203. Each of radio frequency (RF) converters 203 downconverts the signal it receives to baseband, converts the baseband analog signal it received to a digital representation, and supplies the digital representation to channel statistics estimation unit 207.

Channel statistics estimation unit 207 develops certain statistics regarding the channel. In particular, channel statistics estimation unit 207 may develop a) an estimate of the average signal-to-interference-and-noise ratio (SINR), $\rho$, and b) the correlation among the channel components, $\eta$. The correlation among the channel components is developed using an estimate of the forward matrix channel response which is developed in the conventional manner. Note that matrices are required because there are multiple transmit antennas and multiple receive antennas. More specifically, the correlation among the channel components over a time period may be computed as $\eta=K/(K+1)$, where K is the well known Ricean spatial K-factor The channel statistics are supplied either to optional weight parameter calculator 209 or they are supplied via the reverse channel to the transmitter (FIG. 1). If the channel statistics are supplied to weight parameter calculator 209, weight parameter calculator 209 determines the weight parameter that is to be used, in accordance with an aspect of the invention and as described hereinbelow, and supplies the resulting weight parameter to the transmitter (FIG. 1) via the reverse channel.

FIG. 3 shows an exemplary process, in flow chart form, for developing signals to transmit in a MIMO system having a transmitter with M transmit antennas transmitting over a forward channel to a receiver having N receiver antennas and a reverse channel for communicating from the receiver to the transmitter, such that even in the face of some correlation the most open-loop capacity that can be achieved with a channel of that level of correlation is obtained with a substantially open-loop process, in accordance with the principles of the invention. The process of FIG. 3 may be employed in an embodiment of the invention that uses the hardware of FIGS. 1 and 2, with switch 211 being connected to channel statistics estimation unit 207 as follows.

First it is necessary to determine the length of time during which the channel statistics are stable. This is typically performed at the system engineering phase of developing the system, using measurements of the environment into which the system is to be deployed, as is well known by those of ordinary skill in the art. Once the length of time for which the channel statistics are stable is known, that time is the time period over which information will be gathered to generate each statistic.

The process of FIG. 3 is entered in step 301 at the beginning of each time period. Next, in step 303, the channel statistics are estimated over the time period.

Thereafter, in step 305, (FIG. 3) the statistics are supplied by the receiver of the forward link to the transmitter of forward link, e.g., via the reverse channel.

In step 307 the first and second weights, $\alpha_1$ and $\alpha_2$ are calculated, e.g., by weight supplier 105 (FIG. 1). More specifically, the weights are calculated as follows.

$$\alpha_1 = \sqrt{\frac{P_T}{M} - \alpha_2^2}$$

$$\alpha_2 = \sqrt{\frac{P_T \eta}{\rho N (1-\eta)(M\eta + 1 - \eta)}}$$

where M, N, $\rho$, $\eta$ are as defined hereinabove and $P_T$ is the total available transmit power. Thus it can be seen that there is a relationship between the two weights, allowing one of them to act as the weight parameter from which the other is determined, e.g., according to the following $$M(\alpha_1^2 + \alpha_2^2) = P_T.$$

In step 309, the input data stream is divided into M+1 substreams e.g., by demultiplexer 101 (FIG. 1). Each of the first M data substreams is then multiplied by weight $\alpha_1$ in step 311 (FIG. 3). In other words, each bit of each particular data stream is multiplied by $\alpha_1$ to produce M weighted data substreams. Additionally, the M+1$^{th}$ data substream is multiplied by $\alpha_2$ to produce the M+1$^{th}$ weighted data substream.

In step 313, each of the first M weighted data substreams is combined with the M+1$^{th}$ weighted data substream, e.g., by adders 109. The process then exits in step 315.

FIG. 4 shows another exemplary process, in flow chart form, for developing signals to transmit in a MIMO system having a transmitter with M transmit antennas transmitting over a forward channel to a receiver having N receiver antennas and a reverse channel for communicating from the receiver to the transmitter, such that even in the face of some correlation the most open-loop capacity that can be achieved with a channel of that level of correlation is obtained with a substantially open-loop process, in accordance with the principles of the invention. The process of FIG. 4 may be employed in an embodiment of the invention that uses the hardware of FIGS. 1 and 2, with switch 211 being connected to weight calculator 209. Note that for the process of FIG. 4, weight supplier 105 of FIG. 1 will not compute the various weights, but will instead merely store the weights received from weight calculator 209 and supply them to the various ones of multipliers 113 as is necessary.

The process of FIG. 4 is entered in step 401 at the beginning of each time period. Next, in step 404, the channel statistics are estimated over the time period.

In step 405 at least one of the weights $\alpha_1$ and $\alpha_2$ are calculated e.g., by weight parameter calculator 209 (FIG. 2). The at least one weight, or both of the weights, if both are calculated, are calculated in the same manner as described above. It is only necessary to calculate one of the weights which can then act as the weight parameter, from which the other weight can be determined in the transmitter using the relationship described above.

Thereafter, in step 407, either both weights or the determined weight parameter is supplied by the receiver of the forward link to the transmitter of forward link, e.g., via the reverse channel. The weight is stored in weight supplier 105 (FIG. 1). If only one weight is supplied as a weigh parameter, the other weight is computed in weight supplier 105 and then also stored therein.

In step 409, the input data stream is divided into M+1 substreams e.g., by demultiplexer 101 (FIG. 1). Each of the first M data substreams is then multiplied by weight $\alpha_1$ in step 411 (FIG. 4). In other words, each bit of each of each particular data stream is multiplied by $\alpha_1$ to produce M weighted data substreams. Additionally, the M+1$^{th}$ data substream is multiplied by $\alpha_2$ to produce the M+1$^{th}$ weighted data substream.

In step 413 each of the first M weighted data substreams is combined with the M+1$^{th}$ weighted data substream, e.g., by adders 109. The process then exits in step 415.

Figure 5:
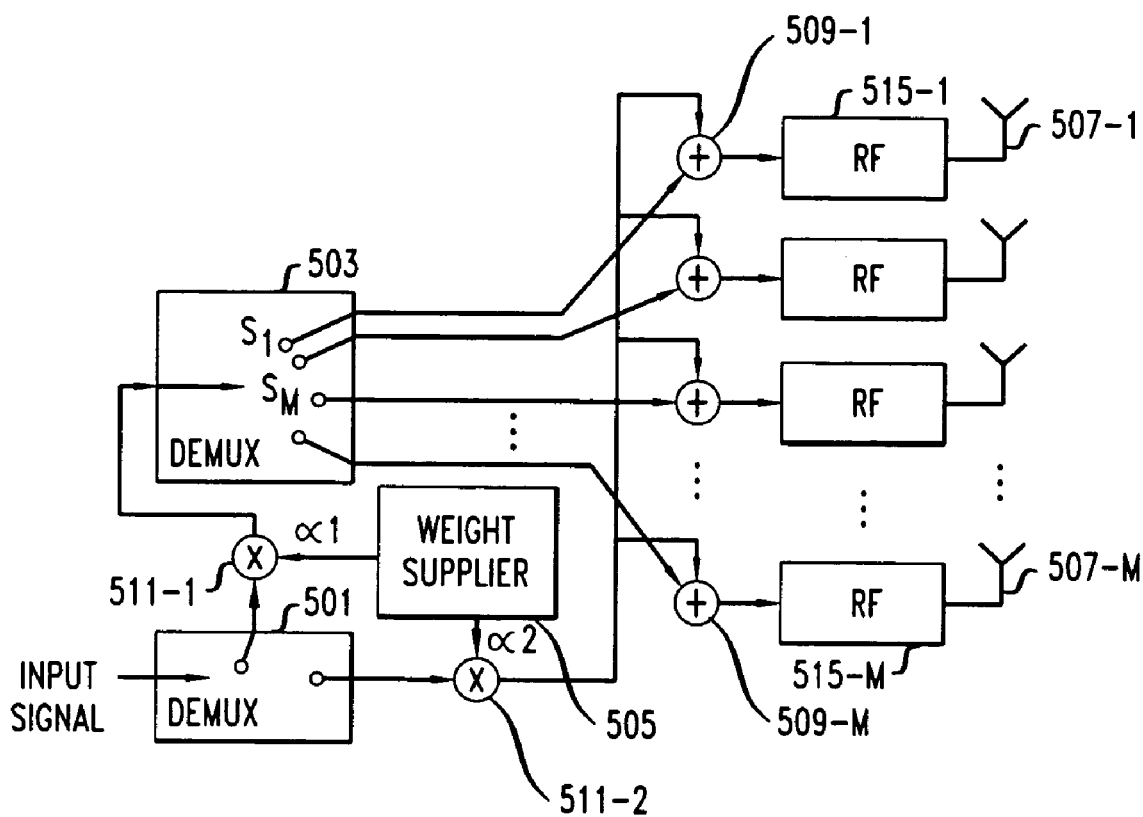
FIG. 5 shows an another exemplary portion of a transmitter for developing signals to transmit in a MIMO system having a transmitter with M transmit antennas transmitting over a forward channel, such that even in the face of some correlation the most open-loop capacity that can be achieved with a channel of that level of correlation is obtained, in accordance with the principles of the invention.

FIG. 5 shows an another exemplary portion of a transmitter for developing signals to transmit in a MIMO system having a transmitter with M transmit antennas transmitting over a forward channel, such that even in the face of some correlation the most open-loop capacity that can be achieved with a channel of that level of correlation is obtained, in accordance with the principles of the invention. Shown in FIG. 5 are a) demultiplexers (demux) 501 and 503; b) weight supplier 505; c) antennas 507, including antennas 507-1 through 507-M; d) adders 509, including adders 509-1 through 509-M; e) multipliers 511-1 and 511-2; and f) radio frequency (RF) converters 515; including 515-1 through 515-M.

Demultiplexer 501 takes a data stream as an input and supplies as an output two data substreams by supplying various bits from the input data stream to each of the data substreams. The first data substream is supplied by demultiplexer 501 to multiplier 511-1 while the second data substream is supplied to multiplier 511-2. Multiplier 511-1 multiplies each value of the first substream by a first weight supplied by weight supplier 505. Similarly, multiplier 511-2 multiplies each value of the second substream by a second weight supplied by weight supplier 505.

The first and second weights may be related to each other, and may be developed by weight supplier 505 from a common weight parameter which may be derived from statistics of the forward channel, as will be described in more detail hereinbelow. In one embodiment of the invention, weight supplier 505 actually develops the weight values in response to information received via the reverse channel from the receiver shown and described herein above in connection with FIG. 2. In another embodiment of the invention the weight values are developed in the receiver, then supplied via the reverse channel to the transmitter, in which they are stored in weight supplier 505 until such time as they are required.

Demultiplexer 503 takes the weighted data substream supplied as an output by multiplier 511-1 and supplies as an output M weighted data substreams by supplying various bits from the weighted data substream it received to each of the data M weighted substreams. Typically, each of the M weighted data substreams are of equal rate. Each of the M weighted data substreams developed by demultiplexer 503 is supplied as an input of a respective one of adders 509. Each of adders 509 also receives at its other input the weighted second substream which is supplied as an output by multiplier 511-2. Each of adders 509 combines the two weighted data substreams input to it so as to produce a combined branch signal. Thus, M combined branch signal are produced, one by each of adders 509. Each of radio frequency (RF) converters 515 receives one of the M combined branch signals and develops therefrom radio frequency versions of the M combined branch signals, which are then supplied to respective ones of antennas 507 for transmission.

In another embodiment of the invention, for use with so-called "time division duplex" (TDD) systems, which share a single channel for both the forward and reverse channels, the calculation of the correlation among the channel components η may be performed at either end of the wireless link. This is because, since the forward and reverse channels share the same frequency channel, alternating between which is using the channel at any one time, the channel statistics for the forward and reverse channels will be the same. Therefore, the receiver of the reverse channel will experience the same correlation among the channel components η as the receiver of the forward channel, and so the receiver of the reverse link can measure the correlation among the channel components η that was previously measured by the receiver of the forward link. Likewise, the receiver of the forward channel will experience the same channel response as the receiver of the reverse channel, and so the receiver of the forward link can determine the correlation among the channel components η that were previously determined by the receiver of the reverse link. However, the SINR must still be computed only at the receiver and relayed to the transmitter if necessary.

What is claimed is:

1. A receiver for use in a MIMO system, comprising:
    N receive antennas;
    N radio frequency (RF) converters, each RF converter downconverting a signal it receives from a respective associated antenna to an analog baseband signal and converting said analog baseband signal to a digital representation;
    an estimator, responsive to said digital representations, for determining an estimate of the average signal-to-interference-and-noise ratio (SINR) for a forward channel being received by said receiver;
    an estimator for determining an estimate of a correlation among the channel components for a forward channel being received by said receiver; and
    a weight calculator for calculating at least one weight for use by a transmitter of said forward channel to transmit data substreams to said receiver as a function of said estimates of SINR end correlation among the channel components, said at least one weight being determined in said weight calculator by solving at least one equation of the set consisting of $$\alpha_1 = \sqrt{\frac{P_T}{M} - \alpha_2^2}$$

$$\alpha_2 = \sqrt{\frac{P_T \eta}{\rho N (1-\eta)(M\eta + 1 - \eta)}}$$

where
    $\alpha_1$ and $\alpha_2$ are said first and second weights, respectively,
    $P_T$ is the total available transmit power
    $\rho$ is an estimate of the average signal-to-interference-and-noise ratio (SINR), and
    $\eta$ is the correlation among the channel components,
    M is the number of transmit antennas, and
    N is the number of receiver antennas.

* * * * *